(12) United States Patent
Wieczorek et al.

(10) Patent No.: US 7,543,880 B2
(45) Date of Patent: Jun. 9, 2009

(54) D-RING FOR USE WITH A VISOR

(75) Inventors: Joseph P. Wieczorek, Lake Orion, MI (US); Leslie Hinds, Oxford, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 122 days.

(21) Appl. No.: 11/903,387

(22) Filed: Sep. 21, 2007

(65) Prior Publication Data
US 2009/0079223 A1    Mar. 26, 2009

(51) Int. Cl.
*B60R 7/05* (2006.01)

(52) U.S. Cl. .................... 296/97.9; 296/97.1; 224/312

(58) Field of Classification Search ............. 296/97.9, 296/97.1, 97.6, 97.8, 97.11, 97.12, 97.13; 224/312
See application file for complete search history.

(56) References Cited

U.S. PATENT DOCUMENTS

| 2,549,200 | A | 4/1951 | Hooks |
| 2,637,128 | A | 5/1953 | Weeks |
| 2,726,757 | A | 12/1955 | Kellstrom |
| 2,867,925 | A | 1/1959 | Botts |
| 4,226,006 | A | 10/1980 | Toyama |
| 4,227,241 | A | 10/1980 | Marcus |
| 4,275,913 | A | 6/1981 | Marcus |
| 4,275,916 | A | 6/1981 | Skogler |
| 4,668,005 | A | 5/1987 | Dietz |
| 4,679,843 | A | 7/1987 | Spykerman |
| 4,763,946 | A | 8/1988 | Robbins et al. |
| 4,773,698 | A | 9/1988 | Svensson |
| 5,004,289 | A | 4/1991 | Lanser et al. |
| 5,007,532 | A | 4/1991 | Binish |
| 5,054,734 | A | 10/1991 | Gabas |
| 5,056,852 | A | 10/1991 | Miller |
| 5,061,005 | A | 10/1991 | Van Order et al. |
| 5,066,154 | A | 11/1991 | Renaud |
| 5,074,508 | A | 12/1991 | Powers |
| 5,184,867 | A | 2/1993 | Prillard |
| 5,374,097 | A | 12/1994 | George et al. |
| 5,538,311 | A | 7/1996 | Fusco et al. |
| 5,816,642 | A | 10/1998 | Wilson |
| 6,062,627 | A | 5/2000 | Murdock |
| 6,120,086 | A | 9/2000 | Miller |
| 6,585,308 | B2 | 7/2003 | Sturt et al. |
| 6,604,772 | B2 | 8/2003 | Sturt |

*Primary Examiner*—Joseph D Pape
(74) *Attorney, Agent, or Firm*—Raggio & Dinnin, P.C.

(57) ABSTRACT

A D-ring for use with a visor in a vehicle is disclosed. The D-ring includes a body and a pin arranged between two surfaces of the body. The D-ring also includes a leg extending from the body and an arm extending from a side of the body wherein that arm is generally parallel to the leg. The D-ring also includes a locking ridge extending from an inside surface of the arm and a flange extending from the body substantially parallel to and in spaced relationship to the arm for receiving and holding a planar object between the flange and the arm.

20 Claims, 2 Drawing Sheets

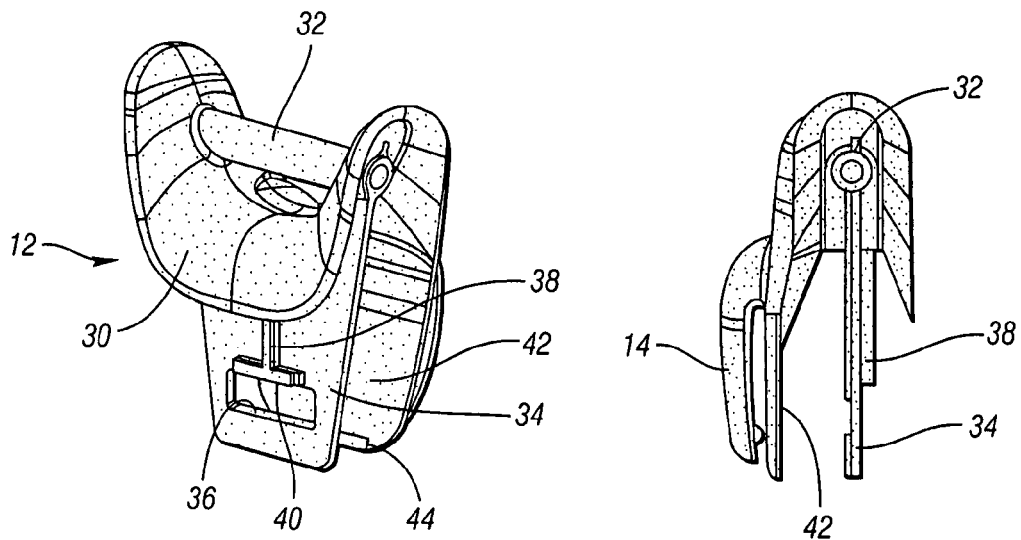
*Fig. 5*    *Fig. 6*
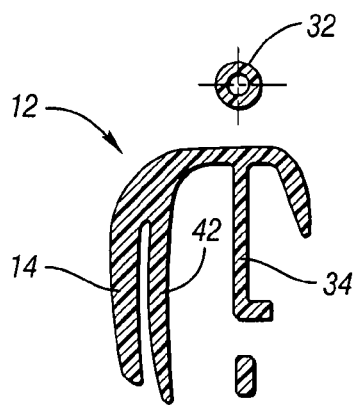
*Fig. 7*
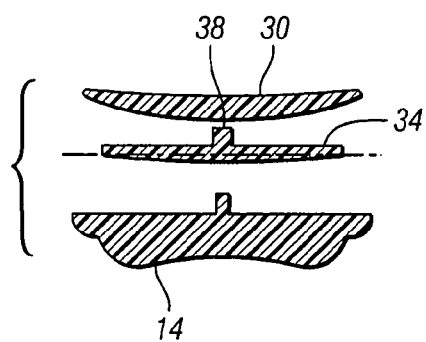    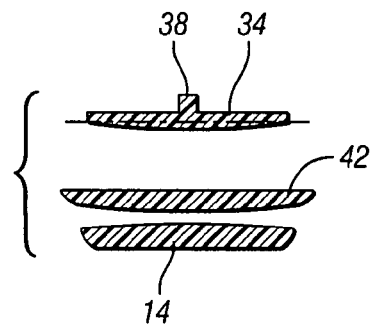
*Fig. 8*    *Fig. 9*

D-RING FOR USE WITH A VISOR

TECHNICAL FIELD

The present invention generally relates to adjustable visors for vehicles, and more particularly relates to a visor having a D-ring or center retainer having a flexible tongue or flange arranged thereon for holding tickets, maps or other planer objects.

BACKGROUND OF THE INVENTION

Sun visors for vehicles have been well known and widely used in the prior art. A typical design includes an elongate planer member that is rotatably and pivotably mounted to a vehicle headliner in an automobile. Various designs have developed over the years, some meeting with wide success. As automobile interiors have advanced in complexity, design and styling, supplemental features and various interior components have become increasingly desirable. The advances in the interior design have accompanied an increasing tendency for exterior designs to be more uniform. Thus, an aesthetically pleasing interior design has become the hallmark of the high quality and luxury in modern day automobiles.

Advances in styling and the addition of features, functions and components for interior trim pieces have, in many instances, caused significant cost increases in manufacturing. These increases result from more labor intensive manufacturing steps, as well as a greater number of components and higher costs associated with intricately styled pieces. Accordingly, interior trim designers are constantly searching for new ways to facilitate manufacturing and assembly of interior trim components without sacrificing style. One approach to this goal has been the increasing use of modular components. A wide variety of designs are known in the prior art for snap-in or other relatively easily attached components for various trim features in the vehicle. For example, many automobile visors are manufactured with optional snap-in mirrors, lights, electrical connectors, and similar features. A particular advantage of modular components is that the universal visor bases may be manufactured, and the modular components optionally attached as desired. Thus, relatively cheaper automobiles may call for a relatively simpler visor design that includes a basic visor body portion covered with upholstery and nothing more. Other, high end models may call for a visor body portion having various additional features, for example, electrical connections, lights, mirrors, clips, etc. Designs are known wherein a single visor body portion may be used as the base module for numerous different vehicle interior designs.

Of particular interest to many designers in the visor art has been the provision of storage devices within the vehicle visor system. The desirability of such devices is familiar to many consumers. It is well known to stuff tickets, maps, letters and other paper materials into a flexible band on the visor. Many consumers will simply position a variety of items above the visor, between the visor body portion and the vehicle headliner, relying on the upward bias of the adjustable visor to maintain the items in place. A major disadvantage of this activity is that the visor cannot be rotated or folded down to a position whereby it can shield incoming sunlight without dumping the contents stored above into the lap of the vehicle driver or passenger. Thus, there is a need in the art to provide a simple letter or holder device for storing various flat items on a vehicle visor such that the visor is still capable of being used to block the sun, glare and the like. There also is a need in the art for a D-ring or center retainer that is capable of securing the upholstery fabric against the body of the visor body while also providing a clip or flexible flange for storing letters or other planar objects thereon. There also is a need in the art for a flange that will be capable of storing planar objects, letters, tickets, etc., between a portion of a D-ring and a surface of the flange. There also is a need in the art for a D-ring with a flange for holding a ticket, letter or other planar object that is easy to manufacturing and install within the automotive vehicle environment.

SUMMARY OF THE INVENTION

One object of the present invention may be to provide a D-ring or center retainer for a visor.

Yet a further object of the present invention may be to provide a visor with a D-ring that includes a flange for holding a letter, ticket, or other planar object thereon.

Still another object of the present invention may be to provide a visor having a D-ring with an arm that engages and holds an upholstery material against the visor body.

Still another object of the present invention may be to provide a D-ring that includes an arm with a locking ridge thereon to engage the upholstery of the visor to ensure objects are not placed between the D-ring arm and the visor body/upholstery material.

Still another object of the present invention may be to provide a D-ring having a flange for holding planar objects or the like that is easy to manufacture, reduce costs, and is easy to install in a visor assembly.

To achieve the foregoing objects a D-ring or center retainer for use with a visor in a vehicle is disclosed. The D-ring includes a body and a pin arranged between two surfaces of the body. A leg extends from the body while an arm extends from a side of the body wherein the arm is generally parallel to the leg. A locking ridge will extend from an inside surface of the arm. A flange extends from the body substantially parallel to and in spaced relationship to the arm for receiving and holding a planar object between the flange and the arm.

One advantage of the present invention is that it may provide an improved center retainer or D-ring for use with a visor.

Another advantage of the present invention is that it may provide a D-ring that includes a flange extending from a portion of the body to hold and secure a letter, ticket or other planar object between the flange and an arm of the D-ring.

Still a further advantage of the present invention is that it may provide a D-ring for use with a visor that includes an arm with a locking ridge that will help secure the upholstery material to the visor body.

Still another advantage of the present invention is that it may provide a D-ring for use with a visor that is easier to manufacture, lower in cost and easier to install in the visor assembly.

Still another advantage of the present invention is that it may provide a D-ring that includes a leg extending from a body that will be used to interact, engage and lock the D-ring to the visor body and hence in part secure the upholstery material to the visor body.

Other objects, features and advantages of the present invention will become apparent from the subject description and appended claims taken in conjunction with the accompanying drawings.

BRIEF DESCRIPTION OF THE DRAWINGS

FIG. 5 shows a back view of a D-ring with a flexible flange according to the present invention.

FIG. 6 shows a side view of a D-ring with a flexible flange according to the present invention.

FIG. 7 shows a cross section of the D-ring having a flexible flange according to the present invention.

FIG. 8 shows a cross section of the D-ring having a flexible flange according to the present invention.

FIG. 9 shows a cross section of the D-ring having a flexible flange according to the present invention.

DESCRIPTION OF THE EMBODIMENT(S)

Figure 1:
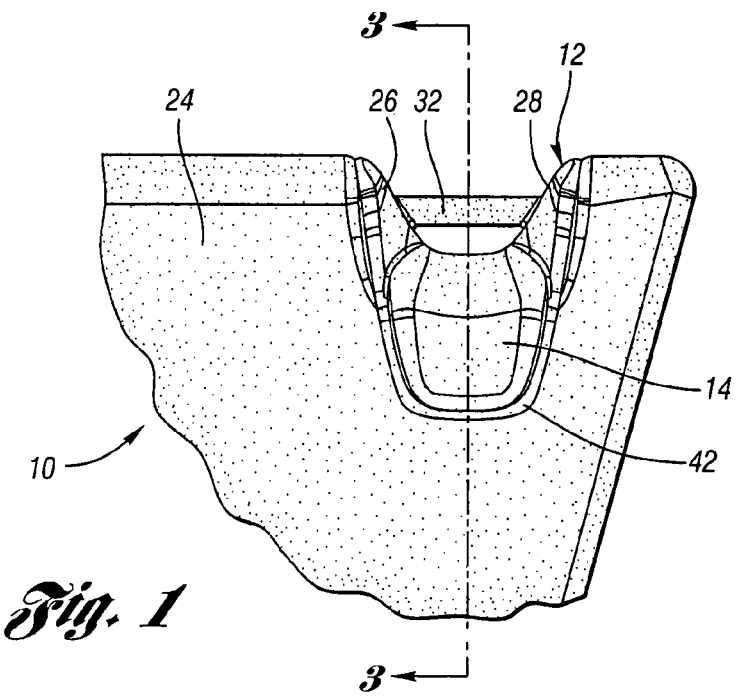
FIG. 1 shows a visor for use in a vehicle according to the present invention.
Figure 2:
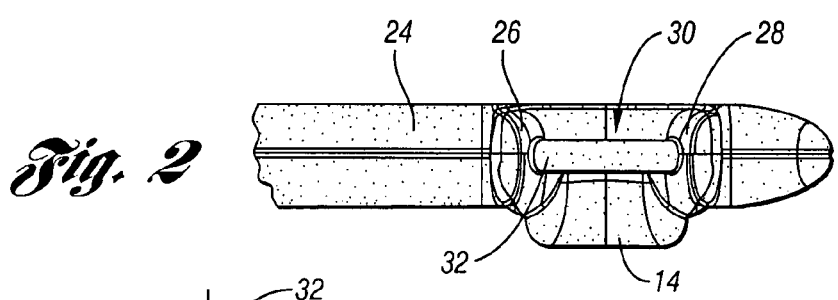
FIG. 2 shows a top view of a visor for a vehicle according to the present invention.

According to the drawings, a visor 10 having a D-ring 12 with a flexible flange 14 for use in a vehicle according to the present invention is shown. The visor 10 generally includes a visor body 16, a visor arm, and a D-ring or center retainer 12 for attaching one end of the visor 10 to a vehicle headliner. The visor arm may include a rod and an elbow that connects to the vehicle headliner and allows for the visor to be rotated to various positions with relation to the passenger or driver of the vehicle to help block the sun and glare therefrom. The visor body 16 may include a first and second visor shell halve 18, 20. The visor shell halves 18, 20 may be made from any known material such as a plastic or any other material and are engageable to form a clam shell type visor body 16. The visor body 16 may also have defined therein an aperture 22 through which a rod is arranged therethrough and an aperture through which the present invention of a D-ring or center retainer 12 is arranged therein. The visor body 16 may also include other openings or apertures to receive mirror assemblies, other accessories, map straps or any other known accessory for use on a visor. Any known visor body 16 molded or made of plastic or any other material and formed in either two separate halves or in one molded piece may be used with the present invention of a D-ring 12 having a flexible flange or tongue 14 thereon. It should also be noted that the visor 10 having the D-ring 12 with flexible flange according to the present invention may be used in any known vehicle, such as an automobile, maritime, space craft, train, or any other vehicle for transporting people wherein the sun may need to be blocked to reduce the glare and increase the driving pleasure for the passengers and driver of the vehicles. Any known elbow, rod or visor halves can be used with the visor assembly 10 according to the present invention. The visor assembly 10 also may be covered with an upholstery material or sock 24 preferably made of a cloth that is similar in appearance with the automobile interior. It should be noted that any other material other than cloth, such as leather, fake leather, any natural material, any synthetic material may also be used as a cover or upholstery 24 for the visor body 16. The visor body 16 may be folded in half to form the visor 10 overall shape and then the upholstery cover 24 will cover the outer surface of the visor body 16.

On one end of the visor 10 on a top portion thereof will be inserted a D-ring 12 having a flexible flange 14 according to the present invention. The D-ring 12 will be inserted into an orifice 22 of the visor body 16 either before the visor body halves 18, 20 are folded and fastened together and the upholstery 24 is placed there over or after the visor body 16 is folded in half and the upholstery 24 is placed there over. Preferably it will be after the visor body halves 18, 20 are secured to one another and the upholstery cover 24 is placed there over. It should be noted that the D-ring 12 generally will be made of a plastic material, however it should be noted that any other metal, ceramic, composite, natural material or the like may be used for the D-ring 12 according to the present invention.

The D-ring 12 generally may have a body 30 that will include a first shoulder 26 and a second shoulder 28 thereon. The body 30 generally may have a saddle like shape, however it should be noted that any other shape may be used for the D-ring body 30 according to the present invention. A pin 32 will extend between two surfaces of the D-ring body 30 and preferably between the first shoulder 26 of the D-ring body 30 and the second shoulder 28 of the D-ring body 30. The pin 32 may be used to interact with and mate with a groove arranged in a member secured to the headliner of the vehicle in which the visor 10 will be used. The pin 32 may interengage with the groove in the member thus, allowing the visor 10 to be secured on one end to the headliner and capable of rotation around the pin 32 into a position to block the sun and glare therefrom. It should be noted that the pin 32 in one contemplated embodiment may be hollow or have an orifice along an entire length thereof. However, it is also contemplated to use a solid pin in the contemplated D-ring member 12. The pin 32 also may be made of the same material as the D-ring body generally a plastic, however any other composite, metal, ceramic, natural material or the like may also be used for the pin 32. The pin 32 may have a predetermined length and a predetermined diameter to mate with the groove on the member attached to the headliner of the vehicle and is also necessary to create a robust connection for the visor body 16.

Figure 3:
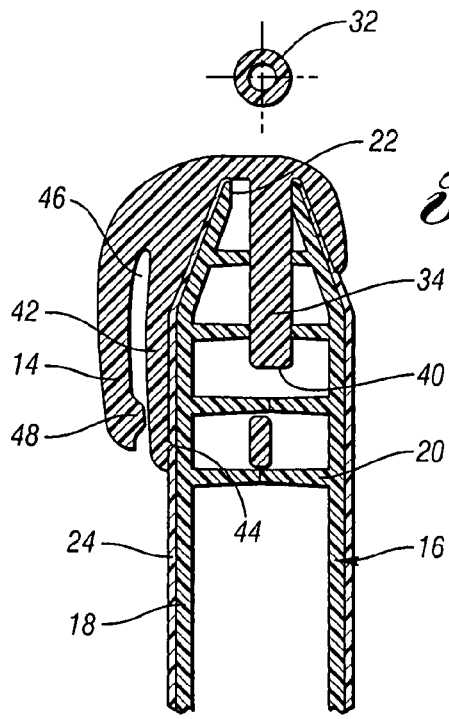
FIG. 3 shows a cross section of the visor and center retainer taken along the line 3-3 of FIG. 1.
Figure 4:
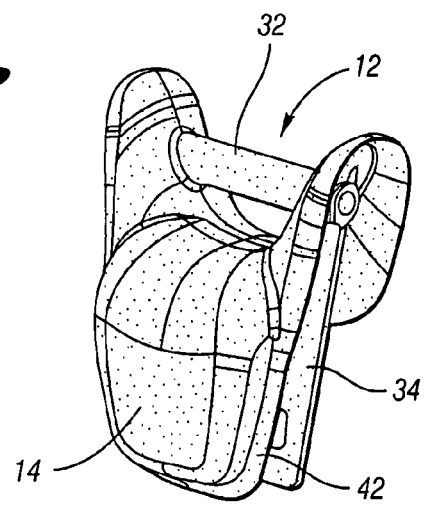
FIG. 4 shows a plan view of a D-ring with a flexible flange according to the present invention.

The D-ring 12 also may include a leg 34 extending from the body 30 in a downward direction away from the pin 32. The leg 34 generally may be aligned with the pin 32 and extend in a direction away from the pin 32 as shown in FIG. 3. It should be noted that the leg 34 may be offset from the pin 32 more than that shown in the drawings depending on the design requirements and the vehicle environment in which the visor 10 will be used. The leg 34 extends a predetermined distance from the body 30 of the D-ring 12 and will have a predetermined shape. In one contemplated embodiment it will have a general quadrilateral shape with a top portion wider than a bottom portion thereof. However, any other known shape can be used for the leg 34. The leg 34 may also include an orifice 36 through a surface thereof. The orifice 36 generally is located near a bottom portion of the leg 34. In one contemplated embodiment the orifice 36 generally will have a rectangular like shape, however any other shaped orifice may be used depending on the design requirements of the visor body 16. The leg 34 may also include a T-shaped member 38 extending from a side surface thereof. The T-shaped member 38 may extend a predetermined distance from a side of the leg 34 on one side of the leg 34. The T-shaped member 38 may have the short portion defining the T-shaped member 38 arranged and aligned along a top edge of the orifice 36. This short portion of the T-shaped member 38 generally defines a locking shoulder 40 which will interengage with a corresponding locking member arranged on an interior surface of the visor body 16 according to the present invention. The locking shoulder 40 may engage with a locking surface of the visor body 16 such that the D-ring 12 will be secured within the visor body 16 thus assisting in holding the visor body 16 together and help in securing in part the upholstery material 24 over the visor body 16 by the D-ring body 30 and associated D-ring arm. It should be noted that the visor body 16 will have an orifice 22 through which the leg 34 of the D-ring member 12 will be arranged therethrough for connecting the D-ring member 12 to the visor body 16. The leg 34 of the D-ring member 12 is contemplated to be arranged within the visor body 16 after the visor halves and the upholstery material 24 have been assembled. However, it is also contemplated to have the D-ring member 12 arranged prior to assembly of the visor body 16 and upholstery material 24 in another contemplated embodiment.

Extending from one side of the D-ring body 30 is an arm 42. The arm 42 generally extends a predetermined distance which is approximately the same distance as the leg 34 extends from an inside surface of the body 30 of the D-ring 12. The arm 42 generally has a predefined shape that will be wider at the top and narrow at the bottom with a curved surface near the bottom of the arm 42. However, it should be noted that any other shaped arm 42 may extend from the side of the D-ring body 30. It should be noted that the arm 42 of the D-ring 12 may be arranged such that when the visor body 16 is flipped up into its stored position against the headliner of the vehicle, the arm 42 will face the dashboard, passenger or driver of the vehicle and when the visor is put into its downward position to block the sun and glare, etc., the arm 42 of the D-ring 12 will face the windshield or window to which the visor 10 is rotated down in front of. It should further be noted that the arm 42 may also include a locking ridge or tooth 44 arranged near the bottom edge of the arm 42 on the inner surface of the arm 42. This locking ridge or tooth 44 will be used to interact with and interengage with the upholstery material 24 arranged over the visor body 16. The locking ridge 44 may be used to interact and embed in the upholstery material 24 to force the upholstery material 24 into an interference contact with the visor body outer surface to ensure that the upholstery material 24 is secured to the visor body 16 at or near the D-ring 12 on the visor body 16. Furthermore, the locking ridge 44 may also ensure that no planar object, such as a letter, ticket, napkin, etc., will be capable of being placed between the arm 42 and the upholstery 24 covering the visor body 10. Therefore, the locking ridge 44 will serve the dual purpose of ensuring the upholstery material 24 is securely arranged against the visor body 16 and also to prevent letters, tickets or any other planar objects from being arranged between the arm 42 of the D-ring 12 and the visor body 16/upholstery 24 arranged there over. It should be noted that the locking ridge 44 also extends towards the leg 34 of the D-ring 12.

Extending directly adjacent to and in spaced relationship therefrom is a flexible flange or tongue 14 from the D-ring arm 42. The flange 14 generally extends from the D-ring body 30 and is substantially parallel to and in space relationship to the arm 42 which also extends from the D-ring body 30. The flexible flange 14 generally does not extend the same distance down as the arm 42, however it is contemplated to have the flexible flange 14 extend the same distance or a considerably shorter distance than the arm 42 depending on the design requirements and the planar objects to be held by the flexible flange 14. It should also be noted that it is also contemplated to have the flexible flange 14 designed such that it can hold objects that are of any known shape and not just planar objects as discussed above. The flexible flange 14 may have a predetermined gap 46 defined between the inner surface of the flexible flange 14 and an outer surface of the arm 42. Generally, the flexible flange 14 and the arm 42 are generally parallel to one another, however other contemplated embodiments are also contemplated. The flexible flange 14 may also include a locking ridge or tooth 48 extending from an inside surface thereof near an end of the flexible flange 14. The locking ridge 48 of the flexible flange 14 may be arranged near or at an end but it is also contemplated to be arranged at other areas on the inside surface of the flexible flange 14. Furthermore, the locking ridge 48 and flexible flange 14 generally are directly adjacent to an outside surface of the arm 42 and in one contemplated embodiment will have contact with the outer surface of the arm 42 prior to insertion of an object therebetween. However, it is also contemplated that no surface contact will occur between the flexible flange 14 and the outer surface of the arm 42.

In operation, a user of the automotive vehicle may place the visor 10 in its upward stored position against the headliner of the vehicle and if need be can store any planar objects, such as a letter, a ticket, parking ticket, parking pass, credit card, or any other generally planar or non planar object between the flexible flange 14 and the arm 42 of the D-ring 12 of the visor 10. Therefore, the flange 14 extending from the body 30 of the D-ring 12 will be substantially parallel and on spaced relationship to the arm 42 which also extends from the body inside of the flexible flange 14 and will be arranged such that it will be capable of receiving and holding a planar object between the flange 14 and the arm 42 to secure the object and create another storage area for the passenger or driver of the vehicle having the visor with the D-ring according to the present invention. Therefore, a ticket, paper, letter, or other planar object may be stored in the D-ring member 12 of the present invention and will have that planar object stored between the flange 14 and the outer surface of the arm 42 of the D-ring 12 and in no way will allow for a ticket member to be arranged between the arm 42 and the material 24 covering the visor 10. This will ensure that the locking ridge 44 arranged on an inner surface of the arm 42 will continue its securing, in part, of the upholstery material 24 to the visor body 16 in the visor assembly according to the present invention. With the D-ring member 12 being made of a generally plastic material, the arm 42 may have a predetermined spring coefficient designed therein such that the flexibility of the flexible flange 14 being moved away from the arm 42 will urge, through its inherent spring force, the flexible flange 14 back towards the outer surface of the arm 42 of the D-ring member 12 thus securing any planar object held therebetween from becoming dislodged during normal operating and crash situations of the vehicle in which the visor 10 will be used.

It should be noted that any known design shapes may be used for the D-ring body, D-ring leg, D-ring arm and D-ring flexible flange depending on the design requirement and the aesthetics necessary for the automobile in which the D-ring 12 will be used therein.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A D-ring for use with a visor in a vehicle, said D-ring including:
   a body;
   a pin arranged between two surfaces of said body;
   a leg extending from said body;
   an arm extending from a side of said body, said arm generally parallel to said leg;
   a locking ridge extending from an inside surface of said arm; and a flange extending from said body substantially parallel to and in spaced relationship to said arm for receiving and holding a planar object between said flange and said arm.

2. The D-ring of claim 1 wherein said body generally having a saddle like shape.

3. The D-ring of claim 1 wherein said leg having an orifice through a surface thereof.

4. The D-ring of claim 3 wherein said leg having a locking shoulder extending therefrom said locking shoulder in part defines an edge of said orifice.

5. The D-ring of claim 4 wherein said leg having a generally T-shaped member extending from a surface thereof, said locking shoulder in part defines said T-shaped member.

6. The D-ring of claim 1 wherein said locking ridge is arranged near an end of said arm and extends towards said leg.

7. The D-ring of claim 1 wherein said flange having a locking ridge extending from an inside surface thereof.

8. The D-ring of claim 7 wherein said locking ridge is arranged near an end of said flange.

9. The D-ring of claim 7 wherein said locking ridge is directly adjacent to an outside surface of said arm.

10. The D-ring of claim 1 wherein the D-ring is made of a plastic material.

11. The D-ring of claim 1 wherein said pin is hollow.

12. A visor for use in a vehicle, said visor including:
a visor body;
a cover arranged over said visor body;
a D-ring member connected to said visor body near one end of said visor body;
said D-ring member including:
a body;
a pin arranged between two surfaces of said body;
a leg extending from said body into said visor body;
an arm extending from a side of said body, said arm generally parallel to said leg;
a locking ridge extending from an inside surface of said arm and interengaging with said cover to in part secure said cover to said visor body; and
a flange extending from said body substantially parallel to and in spaced relationship to said arm for receiving and holding a planar object between said flange and said arm.

13. The visor of claim 12 wherein said locking ridge extending from said arm prevents any object from being arranged between said arm and said cover of said visor body.

14. The visor of claim 12 wherein said leg having an orifice through a surface thereof.

15. The visor of claim 14 wherein said leg having a locking shoulder extending therefrom, said locking shoulder interengages with a surface of said visor body to secure said D-ring member to said visor body.

16. The visor of claim 12 wherein said leg having a generally T-shaped member extending from a surface thereof.

17. The visor of claim 12 wherein said locking ridge is arranged near an end of said arm.

18. The visor of claim 12 wherein said flange having a locking ridge extending from an inside surface thereof.

19. The visor of claim 18 wherein said locking ridge of said flange is arranged near an end of said flange and is directly adjacent to an outside surface of said arm.

20. The visor of claim 12 wherein said pin having a hollow bore therein.

\* \* \* \* \*